(12) United States Patent
Vikberg et al.

(10) Patent No.: US 8,413,226 B2
(45) Date of Patent: Apr. 2, 2013

(54) USER-TYPE HANDLING IN A WIRELESS ACCESS NETWORK

(75) Inventors: Jari Vikberg, Järna (SE); Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 210 days.

(21) Appl. No.: 12/992,227

(22) PCT Filed: May 13, 2008

(86) PCT No.: PCT/SE2008/050553
§ 371 (c)(1),
(2), (4) Date: Nov. 11, 2010

(87) PCT Pub. No.: WO2009/139676
PCT Pub. Date: Nov. 19, 2009

(65) Prior Publication Data
US 2011/0093945 A1    Apr. 21, 2011

(51) Int. Cl.
*H04L 29/06* (2006.01)
*H04L 12/56* (2006.01)
*H04L 12/66* (2006.01)
*H04W 4/00* (2009.01)
*G06F 9/00* (2006.01)
*H04L 12/46* (2006.01)
*H04L 9/00* (2006.01)

(52) U.S. Cl. ....... 726/12; 455/435.1; 370/338; 370/352; 713/156

(58) Field of Classification Search .......... 726/12; 455/435.1; 370/338
See application file for complete search history.

(56) References Cited

U.S. PATENT DOCUMENTS

| 2006/0172732 | A1 | 8/2006 | Nylander et al. | |
| 2007/0268888 | A1* | 11/2007 | Shatzkamer et al. | 370/352 |
| 2008/0305792 | A1* | 12/2008 | Khetawat et al. | 455/435.1 |
| 2012/0246466 | A1* | 9/2012 | Salvarani et al. | 713/156 |

FOREIGN PATENT DOCUMENTS
EP    1094682 A1 *  4/2001

OTHER PUBLICATIONS

Ravishankar Borgaonkar, Kevin Redon, Jean-Pierre Seifert; "Security analysis of a femtocell device"; Nov. 2011; SIN '11: Proceedings of the 4th international conference on Security of information and networks; Publisher: ACM; pp. 95-102.*

* cited by examiner

*Primary Examiner* — Andrew L Nalven
*Assistant Examiner* — Courtney Fields

(57) ABSTRACT

A system, method, and apparatus in an access network such as the Generic Access Network (GAN) for providing user-type information to a Security Gateway (SEGW) or for enabling the SEGW to obtain user-type information for different user types so that the SEGW can apply specific security functions based on the user type. The invention may also provide user-type information to a controller node such as a GAN Controller (GANC) or may enable the GANC to obtain user-type information for application of security settings toward GAN-clients. An Authentication, Authorization and Accounting (AAA) Server may create a user-type indication internally, or may obtain an indication from a Home Location Register and forward the indication to the SEGW. The SEGW may forward the indication to the GANC, or the GANC may determine the user-type information internally or retrieve it from a database.

16 Claims, 13 Drawing Sheets

USER-TYPE HANDLING IN A WIRELESS ACCESS NETWORK

TECHNICAL FIELD

The present invention relates to wireless telecommunication networks. More specifically, and without limitation, the invention is directed to a method of informing a Security Gateway (SEGW) and/or a Generic Access Network Controller (GANC) about different user types.

BACKGROUND

The Third Generation Partnership Project (3GPP) has standardized the Generic Access Network (GAN)-concept starting from 3GPP Release-6. The more precise name utilized by 3GPP is "Generic Access to A/Gb Interfaces" and this standardization was based on the Unlicensed Mobile Access (UMA) de-facto specifications. Two examples of existing solutions for enabling a Mobile Station (MS) to access a GSM Core Network (CN) are: a GAN solution and a GSM-Femto solution.

FIG. 1 is a functional block diagram from 3GPP TS 43.318 illustrating an architecture of the GAN 10. GAN is specified in the 3GPP TS 43.318 and TS 44.318. A mobile station (MS) 11 connects through a WiFi access point (AP) in a generic IP access network 12. GAN provides a new Radio Access Network (RAN), and the node corresponding to the GERAN Base Station Controller is called the Generic Access Network Controller (GANC) 13. The GANC 13 includes a Security Gateway (SEGW) 14 and connects to a GSM Core Network (CN) 15. The MS is a dual-mode, dual-radio handset including for example both WiFi and 3GPP-macro radio support (e.g. GSM, WCDMA or both). The MS connects to the WiFi AP utilizing the WiFi Radio. The GAN standard defines for example how the MS can function in GAN mode and access the services provided by the GSM CN using the Up-interface 16 between the MS and the GANC.

The Up-interface 16 may traverse unsafe IP networks and is therefore protected by a secure IP tunnel between the MS 11 and the GANC 13 handled by the SEGW 14.

The current GAN standard may be referred to as "2G-GAN" or "GSM-GAN" because the standard GSM A-interface and Gb-interface are utilized between the GANC and the CN. Work is ongoing to standardize a "3G-GAN" or "WCDMA-GAN" solution. In this case, the GANC will utilize standard WCDMA interfaces such as the Iu-cs and the Iu-ps interfaces to connect to the CN. The resulting standard can be also called "Generic Access to Iu Interfaces" or "GAN-Iu".

FIG. 2 is a protocol diagram illustrating a circuit-switched (CS) Domain Control Plane Architecture 20 related to the GAN solution and the Up-interface 16. The GANC 13 uses normal A-interface signaling towards the Mobile Switching Center (MSC) 21. The GANC interworks the related protocols, like the Base Station System Application Part (BSSAP) 22, towards the relevant GAN-protocols, such as Generic Access—Circuit Switched Resources (GA-CSR) 23, in both directions.

FIG. 3 is a signaling diagram illustrating the existing GAN registration procedure between the MS 11 and the GANC 13. This procedure is well defined, for example, in the 3GPP Technical Specifications for GAN, therefore the procedure will not be described in detail here, although several steps are relevant to the present invention.

At step 3, an IPsec tunnel is established between the MS and the SEGW 14 using IKEv2 signaling. The MS holds a (U)SIM card and the tunnel establishment is authenticated using EAP-SIM or EAP-AKA signaling between the MS and the Authentication, Authorization and Accounting (AAA) server 25 as requested by the SEGW. The authentication procedure is really performed towards the (U)SIM card in the MS. The AAA contacts an HLR/AuC 26 to retrieve required security keys to be used as part of the EAP-SIM or EAP-AKA signaling.

At step 6, the MS 11 sends a GA-RC REGISTER REQUEST message to the GANC 13 and may indicate some information about the MS capabilities in the GAN Classmark Information Element (IE).

At step 7, the GAN registration attempt is accepted by the GANC 13 and a GA-RC REGISTER ACCEPT message is returned to the MS 11. The reject and redirect cases as shown in alternative steps 8 and 9 are not relevant to the present invention and are shown only for completeness.

FIG. 4 is a signaling diagram illustrating the existing GAN signaling sequence when a periodic Location Update is performed in GAN-mode. The most relevant parts of this sequence are steps 11-12 in which the GANC 13 receives a (BSSAP) CIPHER MODE COMMAND and is supposed to trigger signaling towards the MS 11. These particular steps are used here as an example of how the GANC should act towards the different types of terminals and access points accessing the system.

FIG. 5 is a functional block diagram of an architecture of a GSM-Femto access network. The GSM-Femto solution provides small femto cells for the end users by having small GSM radio base stations in, for example, the user's home premises. The small radio base station is called a Femto Cell Customer Premises Equipment (CPE) 31. The Femto Cell CPE connects to the network using the proprietary Fp and Abis-over-IP interfaces. The node corresponding to the GERAN BSC is called a Femto BSC 32. No specific 3GPP standard exists for the GSM-Femto solution. One of the main differences from the GAN solution described above is that MSs do not require any changes because the standard GSM Um-interface is used between the MS and the Femto Cell CPE. The MS connects to the Femto Cell CPE as normally in GERAN. The Femto Cell CPE is then connected to the Femto BSC using the proprietary Fp and Abis-over-IP interfaces.

FIG. 6 is a protocol diagram illustrating a CS Domain Control Plane Architecture 40 related to the GSM-Femto solution of FIG. 6. The Femto BSC 32 uses normal A-interface signaling towards the MSC 21. The Femto BSC interworks the related protocols, like BSSAP 22, towards the relevant GSM-protocols such as GSM Radio Resources (GSM RR) 41 in both directions.

The security solution applied for the GSM Femto solution is very similar to the solution used in GAN (and as described in FIG. 3). The Femto Cell CPE 31 establishes an IPsec tunnel to the SEGW 14 using the same mechanisms as in GAN. The main difference is that the Femto Cell CPE contains the (U)SIM card that is authenticated towards the AAA server 25.

SUMMARY

In different embodiments, the present invention provides user-type information to the SEGW or enables the SEGW to obtain user-type information for different user types so that the SEGW can apply specific security functions based on the user type. The invention is applicable to all solutions where a component such as the SEGW is utilized. The invention may also provide user-type information to a control node such as a GANC or enable the GANC to obtain user-type information for application of security settings toward GAN-clients.

In one embodiment, the present invention is directed to a method in a wireless access network for providing a user-type indication to a Security Gateway (SEGW) during a registration procedure for a user. The method includes the steps of receiving in an Authentication, Authorization and Accounting (AAA) server, a request to authenticate the user; and sending a user-type indication for the user from the AAA server to the SEGW with an authentication success message. The user-type indication may be created in the AAA server or may be obtained by the AAA server from a Home Location Register (HLR).

In another embodiment, the present invention is directed to a method in a wireless access network for determining user-type information in an SEGW during a registration procedure for a user. The method includes the steps of configuring the SEGW with user-type information associated with different International Mobile Station Identities (IMSIs) or IMSI number series; receiving the user's IMSI in the SEGW during the registration procedure; and determining user-type information for the user based on the user's IMSI or an associated IMSI number series.

In either of the two embodiments above, the registration procedure may be performed in a Generic Access Network (GAN), and the SEGW may also send the user-type information to a Generic Access Network Controller (GANC).

In another embodiment, the present invention is directed to a method in a wireless access network for obtaining user-type information by a controller node during a registration procedure for a user. The method includes the steps of configuring a database with user-type information associated with different IMSIs or IMSI number series; receiving the user's IMSI in the controller node during the registration procedure; and utilizing the user's IMSI by the controller node to retrieve the user-type information for the user from the database.

In another embodiment, the controller node itself is configured with user-type information associated with different IMSIs or IMSI number series. When the controller node receives the user's IMSI during the registration procedure, the controller node utilizes the user's IMSI to determine the user-type information for the user.

In another embodiment, the present invention is directed to a AAA server for providing a user-type indication to an SEGW during a registration procedure for a user. The AAA server includes means for receiving a request to authenticate the user; and means for sending a user-type indication for the user to the SEGW with an authentication success message. The AAA server may create the user-type indication internally, or may obtain the user-type indication from an HLR.

In another embodiment, the present invention is directed to an apparatus in a SEGW in an access network. The apparatus includes a database configured to associate user-type information with different IMSIs or IMSI number series; means for receiving a user's IMSI during a registration procedure; and means for determining user-type information for the user based on the user's IMSI or an associated IMSI number series.

In another embodiment, the present invention is directed to a system in an access network for providing user-type information to a controller node during a registration procedure for a user. The system includes a database configured to associate user-type information with different IMSIs or IMSI number series; means within the controller node for receiving the user's IMSI during a registration procedure; and means within the controller node for utilizing the user's IMSI to retrieve the user-type information for the user from the database.

Alternatively, the controller node may be configured internally with user-type information associated with different IMSIs or IMSI number series. When the controller node receives the user's IMSI during the registration procedure, the controller node utilizes the user's IMSI to determine the user-type information for the user.

BRIEF DESCRIPTION OF THE DRAWINGS

In the following, the essential features of the invention will be described in detail by showing preferred embodiments, with reference to the attached figures in which.

DETAILED DESCRIPTION

Figure 7:
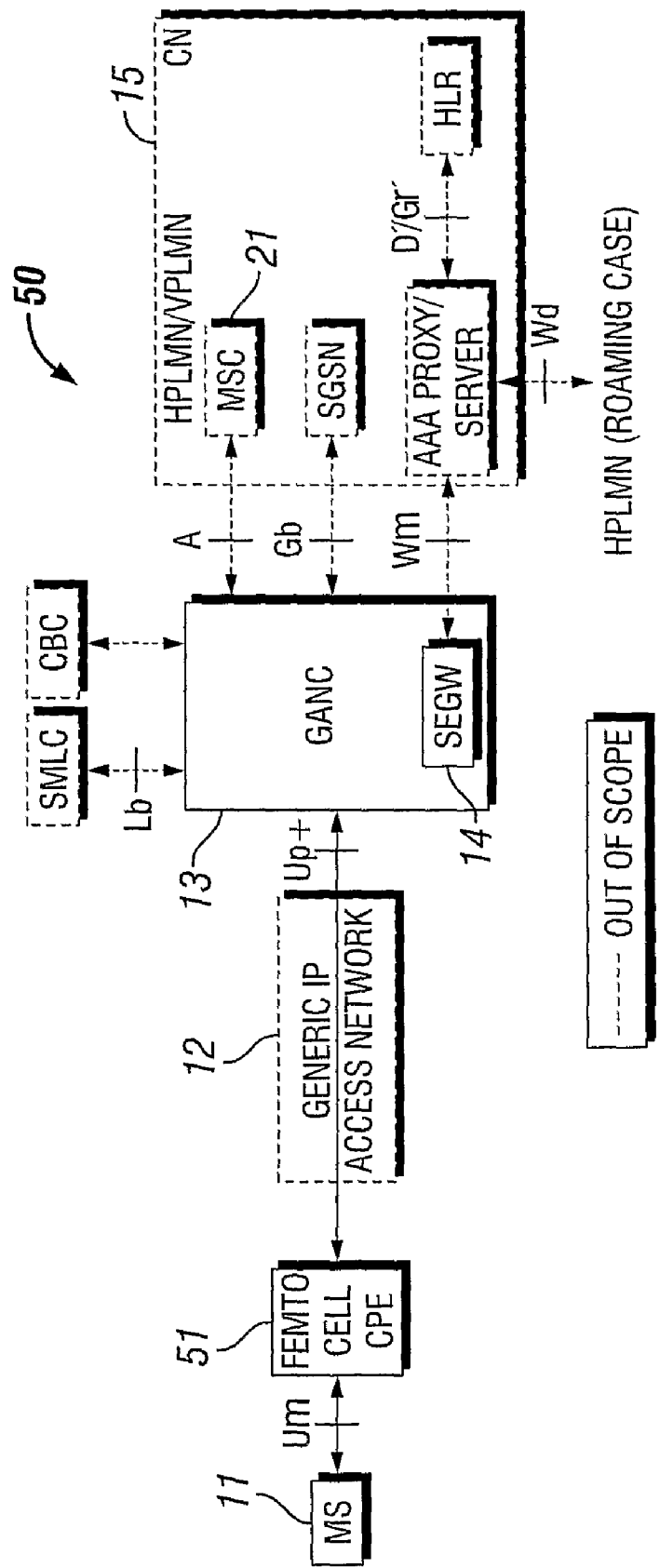
FIG. 7 is a functional block diagram of an architecture of a combined GAN-GSM-Femto access network suitable for use in implementing the present invention.

FIG. 7 is a functional block diagram of an architecture of a combined GAN-GSM-Femto access network 50 suitable for use in implementing the present invention. To develop an access solution with advantages over either the GAN solution or the GSM-Femto solution, one can combine the two solutions, utilizing the best properties of each. The combined solution allows existing MSs to be utilized because the Um-interface is used between the MS 11 and a modified Femto Cell CPE 51. The Femto Cell CPE in the combined solution is modified to include a GAN-client, enabling the Up-interface to be used to connect the Femto Cell CPE 51 to the GANC 13. The standardized Up-interface requires some modifications, and thus a so-called Up+interface is utilized. The GANC uses the normal GSM interfaces towards the CN 15 and the other support nodes as in the normal GAN solution.

Figure 8:
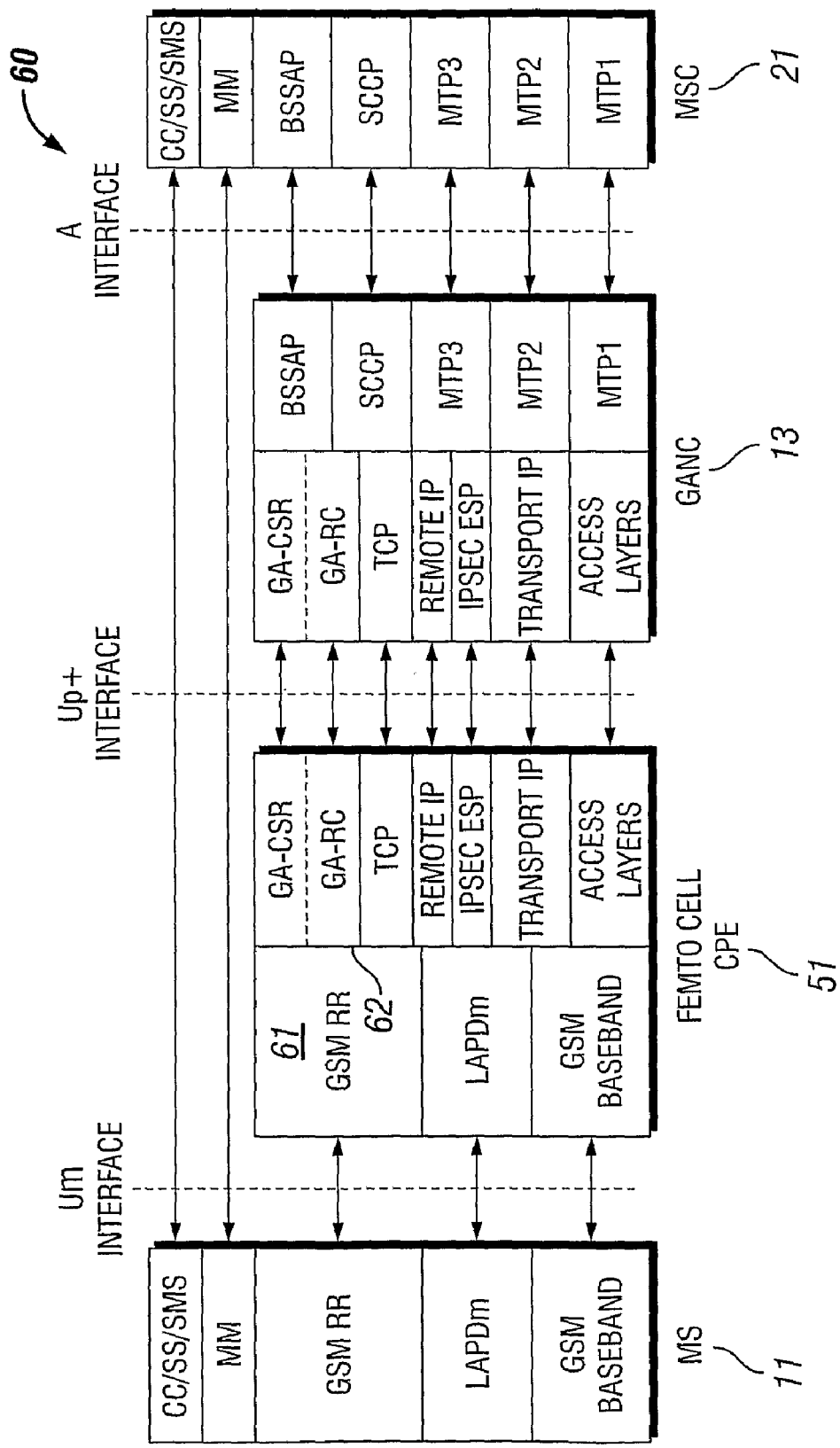
FIG. 8 is a protocol diagram illustrating a CS Domain Control Plane Architecture related to the combined GAN-GSM-Femto access network of FIG. 7.

FIG. 8 is a protocol diagram illustrating a CS Domain Control Plane Architecture 60 related to the combined GAN-GSM-Femto access network of FIG. 7. The Femto Cell CPE 51 is extended both with BSC functionality 61 and with a GAN-client 62. The BSC functionality is needed to terminate the GSM RR protocol from the MS 11 and the GAN-client is needed to interwork between GSM RR and the GA-CSR protocol. The GANC 13 then interworks between the GA-CSR and the BSSAP protocols.

The security solution applied for the GAN-GSM-Femto network 50 is very similar to the solution used in GAN and in GSM-Femto. The Femto Cell CPE 51 establishes an IPsec tunnel to the SEGW 14 using the same mechanisms as in GAN. The main difference towards GAN is that the Femto Cell CPE contains the (U)SIM card that is authenticated towards the AAA server 25 (and this is exactly the same as in the GSM-Femto solution).

Figure 9:
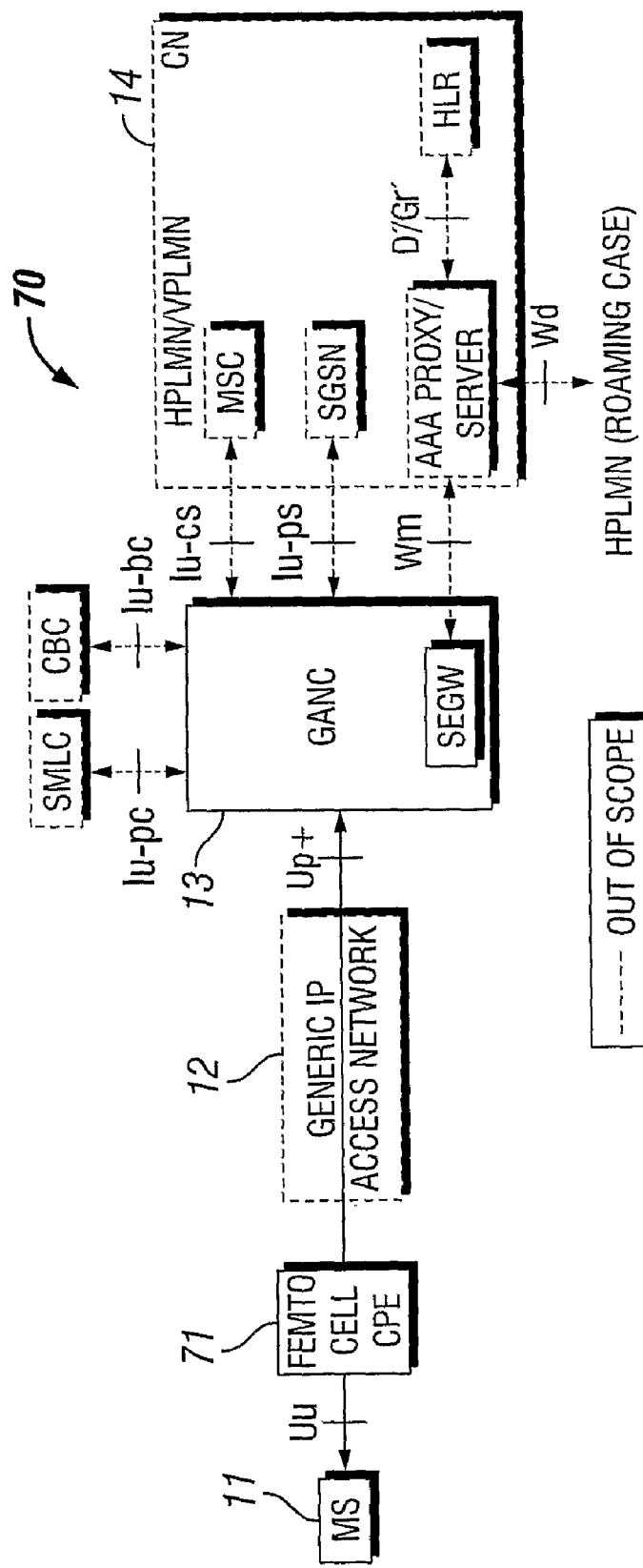
FIG. 9 is a functional block diagram of an architecture of a GAN-WCDMA-Femto access network suitable for use in implementing the present invention.

FIG. 9 is a functional block diagram of an architecture of a GAN-WCDMA-Femto access network 70 suitable for use in implementing the present invention. In this case, the normal Iu interface is utilized between the GANC and the mobile core network side and the air interface to the MSs is the Uu-interface. A modified Femto Cell CPE 71 is modified to include UTRAN Radio Network Controller (RNC) functionality.

Figure 10:
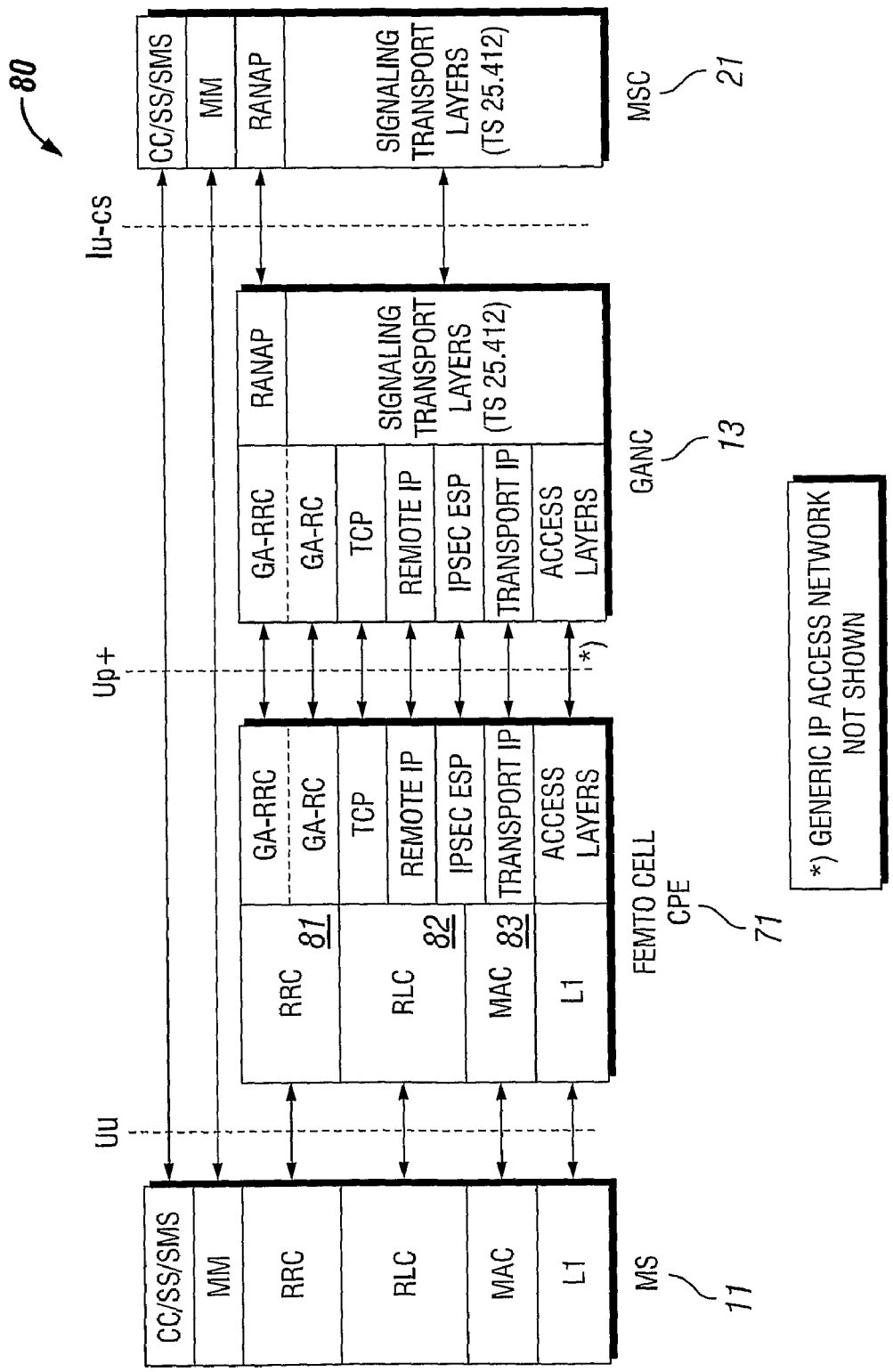
FIG. 10 is a protocol diagram illustrating a CS Domain Control Plane Architecture related to the GAN-WCDMA-Femto access network of FIG. 9.

FIG. 10 is a protocol diagram illustrating a CS Domain Control Plane Architecture 80 related to the WCDMA-Femto access network of FIG. 9. As noted, the modified Femto Cell CPE 71 is modified to include UTRAN RNC functionality in the Radio Resource Control (RRC) 81, Radio Link Control (RLC) 82, and Media Access Control (MAC) 83 layers.

Figure 11:
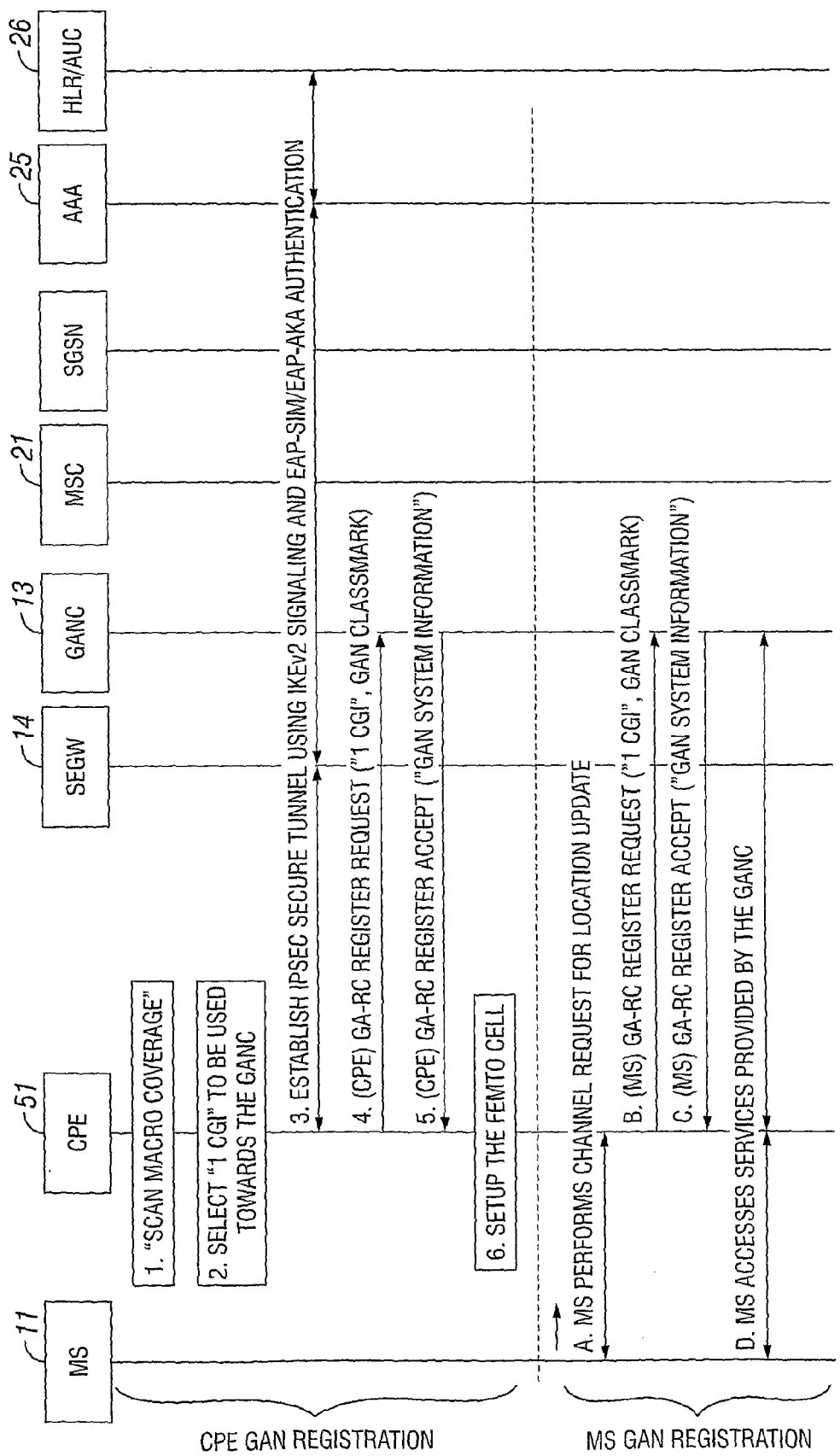
FIG. 11 is a signaling diagram illustrating two different types of GAN Registrations performed by the Femto Cell CPE towards the GANC.

FIG. 11 is a signaling diagram illustrating two different types of GAN Registrations performed by the Femto Cell CPE 51 towards the GANC 13. The two types of registrations are called CPE GAN Registration and MS GAN Registration. The CPE GAN Registration is performed when the Femto Cell CPE 51 is powered on and the associated femto cell is created. After the Femto Cell CPE 51 sends a (CPE) GA-RC REGISTER REQUEST message to the GANC 13, the GANC returns a (CPE) GA-RC REGISTER ACCEPT message with GAN system information needed for femto cell setup by the Femto Cell CPE.

The MS GAN Registration is performed by the Femto Cell CPE 51 when it detects that an MS 11 is trying to access the femto cell. This normally happens when the MS performs a Location Updating procedure via the femto cell because the femto cell has a different Location Area Identifier (LAI) compared to macro cells in the area. After the Femto Cell CPE 51 sends a (MS) GA-RC REGISTER REQUEST message to the GANC 13, the GANC returns a (MS) GA-RC REGISTER ACCEPT message with GAN system information. After this, the MS can access services provided by the GANC, i.e., the MS has access to both the MSC and the SGSN.

The GANC 13 is able to combine these two procedures. In other words, the GANC is able to find out that the MS GAN REGISTRATION relates to a specific CPE GAN REGISTRATION (since the same IPsec tunnel is used).

The present invention relates to the use of common nodes in the different embodiments described above. The common nodes and related principles as follows:

1. SEGW (Security Gateway)

All the embodiments described herein utilize IPsec tunnels to access the network. These IPsec tunnels are established between the MS 11 and SEGW 14 (in GAN) or between the Home Access Point (HAP, e.g. Femto Cell CPE) and the SEGW. This means that the SEGW is one common node between these embodiments. The different embodiments, however, have different types of security requirements that the SEGW must enforce on the IPsec tunnels. These requirements are related for example to the number of TCP connections/UDP-streams in the tunnel or total bandwidth allowed in the tunnel. One clear reason for the differences is that in GAN, there is a single IPsec tunnel for each MS, and in the other solutions, all the MSs accessing one HAP share the same IPsec tunnel.

2. GANC (GAN Controller) or Other Controller Node

There are standardization efforts ongoing for solutions other than GAN that use the SEGW 14, and all solutions include some form of gateway or controller node for controlling MS registration. Although the present invention is described herein in terms of the GAN, it should be understood that the invention is applicable to any type of gateway or controller node that controls MS registration and communicates with the SEGW.

The GAN, the GAN-GSM-Femto network, and the GAN-WCDMA-Femto network all contain the GANC 13. There are however some functional differences in how the GANC functions for example towards a GAN-enabled MS and a HAP utilizing the GAN. The GANC may apply some security settings towards GAN-clients.

Another exemplary difference is related to the Cipher Mode Control procedure as described in 3GPP TS 48.008 and used in the context of the "GAN A/Gb". The cipher mode control procedure enables the MSC 21 to pass cipher mode information to the GANC 13 to select and load the user data and signaling encryption device with the appropriate key.

However, in GAN mode, all the communication between the MS 11 and the SEGW 14 is encrypted using the IPsec tunnel and there is no need for the encryption keys. This means that when the GANC receives the CIPHER MODE COMMAND message, it only sends the algorithm to be used and a "key index" to the MS, which stores the information for possible future use after a handover to GERAN. The CIPHER MODE COMMAND message also includes the encryption key, called Kc, that is normally used by the BSC and BTS to encrypt the air interface towards the MS. As described above, however, the GANC does not forward the Kc key.

There is a different need in the GAN-GSM-Femto network for the handling of the Cipher Mode Control procedure. In this case, the IPsec tunnel is only used to encrypt the traffic between the GANC 13 and the HAP 71. The air interface between the MS 11 and the HAP is a standard GSM air interface and this means that the "Kc" information is needed in the HAP to be able to cipher/decipher this air interface towards the MS.

Thus, the GANC 13 needs to know whether the GAN Registration and all associated traffic-related procedures relate to a GAN-MS or to an MS accessing via the HAP 71.

There is no known solution for informing the common node SEGW 14 about the different user types.

One possible solution for informing the common node GANC 13 of the user types is to extend the GAN Classmark information that is included in the GA-RC REGISTER REQUEST message to indicate "HAP" or "MS behind HAP". The GANC may then use this information to act differently towards the GAN-MS or "MS behind HAP" (and towards the "HAP" as well). This approach, however, has several problems. First, the approach depends on the MS (or GAN-client) accessing the system to set this information correctly. This is not acceptable because a faked GAN-client could set the setting to lower the security restrictions applied and to receive sensitive information (like the "Kc" from the network). Secondly, this approach does not provide the user-type indication to the SEGW 14.

To solve the second problem, a protocol may be implemented between the GANC 13 and the SEGW 14 so that the GANC can inform the SEGW about the user type based on the information the GANC received from the client. However, this would also be a security risk in the case of a malicious client. Furthermore, such an approach would mean that the client has already accessed the network without the SEGW knowing the user type. Since the SEGW is the entry point to the mobile network and the first point of contact where the user's identity is verified, security settings need to be applied from the SEGW.

In the present invention, the network is configured with information about an association between an (U)SIM and the user type. For this reason, the network does not have to rely on the client indicating a specific user type. The invention enables the SEGW 14 to retrieve information about different user types and to apply specific security functions based on the user type. Thus, the invention is applicable to all solutions where a component such as the SEGW 14 is used. For example, the inventive concepts described herein are applicable, at least, for the following solutions:

Interworking WLAN (I-WLAN);
In this case the SEGW is the Packet Data Gateway (PDG).
Untrusted Non-3GPP IP access in SAE/LTE;
In this case the SEGW is the evolved Packet Data Gateway (ePDG).
GSM-Femto, WCDMA-Femto, and LTE-Femto;
UMA/GAN; and
Combination of UMA/GAN and GSM/WCDMA-Femto.

Different embodiments of the present invention are used to illustrate how the SEGW 14 becomes aware of the user-type information, and how the GANC 13 becomes aware of this information. The SEGW may be informed utilizing an HLR-based configuration, an AAA-based configuration, or an SEGW-based configuration. The GANC may be informed by the SEGW after the SEGW learns the information through one of the configurations noted. Alternatively, the GANC may be informed utilizing a GANC-based configuration or a GAN database-based configuration. It should also be noted that the above embodiments may be combined in different ways.

Figure 12:
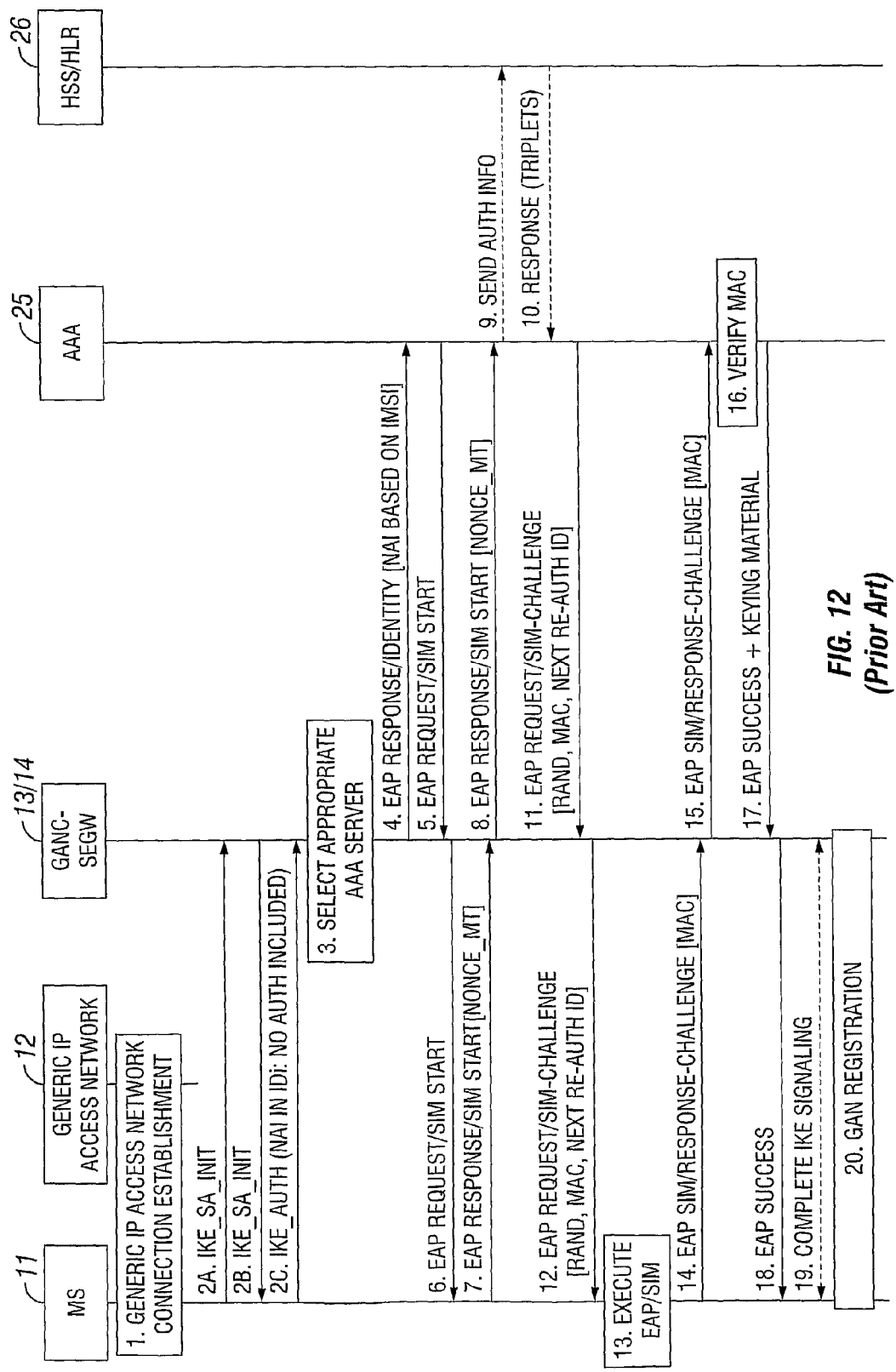
FIG. 12 is a signaling diagram illustrating an existing method of performing IKEv2 signaling and EAP-SIM/AKA authentication.

FIG. 12 is a signaling diagram illustrating an existing method of performing IKEv2 signaling and EAP-SIM/AKA authentication in the GAN solution. The authentication procedure of FIG. 12 is reproduced from Figure A.1 of the technical specification 3GPP TS 43.318 v8.0.0, and will not be discussed further except in the context of modifications and extensions associated with the different embodiments of the present invention described below.

The description below presumes that the different "User types" are coordinated between the different nodes. For example, the SEGW 14 and the GANC 13 are aware of the different user types and have predefined logic that is dependent upon the user type. User types may include, for example, "Home Access Point", "GSM HAP", "WCDMA HAP", "LTE HAP", and the like.

TABLE 1

| User Type | Allowed Band-width (Kbit/sec) | No. of TCP | No. of UDP | Allowed Dest. ports | Allowed Dest. IP/sub net | Allowed Protocols | Allowed no. of IPsec SA | Allowed packets per second |
|---|---|---|---|---|---|---|---|---|
| Default | 100 | 2 | 2 | 14001-14010 24000-24500 53 | 192.160.0.0/16 192.159.1.50 | TCP, UDP | 2 | 20 |
| GSM HAP | 200 | 4 | 4 | 12000-12400 | 192.168.0.0/16 | TCP, UDP | 4 | 100 |
| WCDMA HAP | 1000 | 6 | 6 | 12500-13000 | 192.169.0.0/16 | TCP/UDP, SCTP | 8 | 500 |

Table 1 above provides an example of how the SEGW 14 may be configured for the different "user types". These examples define limitations for each IPsec tunnel. For example, the exemplary table can be read so that user type "GSM HAP" is allowed to use a bandwidth of 200Kbits/second.

The 'user type' itself provides certain information about how the nodes should act. Other information per user type may be related, for example, to security settings. Exemplary settings for the GANC 13 are shown in Table 2 below. These examples define limitations for each GAN registration in the GANC. For example, the exemplary table can be read so that user type "GSM HAP" is allowed to send 200 messages per second.

TABLE 2

| User type | Allowed messages per second | ... |
|---|---|---|
| Default | 20 | |
| GSM HAP | 200 | |
| WCDMA HAP | 1000 | |
| ... | | |

Figure 13:
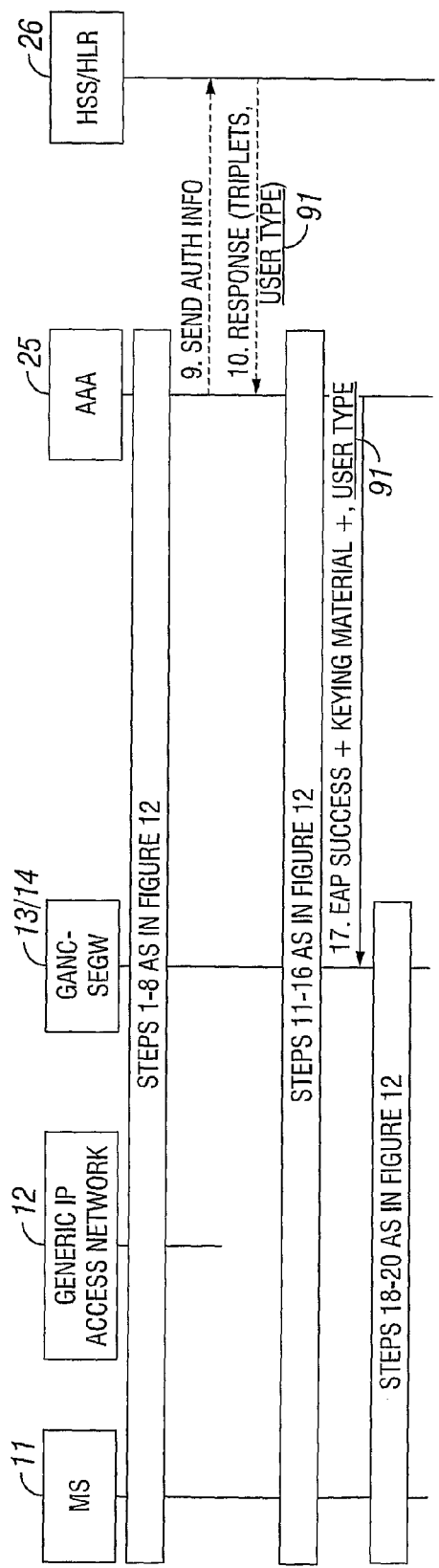
FIG. 13 is a signaling diagram illustrating an extension of FIG. 12 to implement an HLR-based configuration for informing the SEGW of different User types.

FIG. 13 is a signaling diagram illustrating an extension of FIG. 12 to implement the HLR-based configuration for informing the SEGW 14 of different User types. A new "User type" indication 91 is created in the HSS/HLR 26 and returned to the AAA server 25 together with the security information in step 10. The "User Type" indication 91 may be based on an individual IMSI or on an associated IMSI number series. Methods of creating the User-type indication other than variations of the IMSI-number series are also possible. The AAA server then returns the "User type" information to the SEGW in step 17 and the SEGW utilizes this information to differentiate between different user types.

Figure 14:
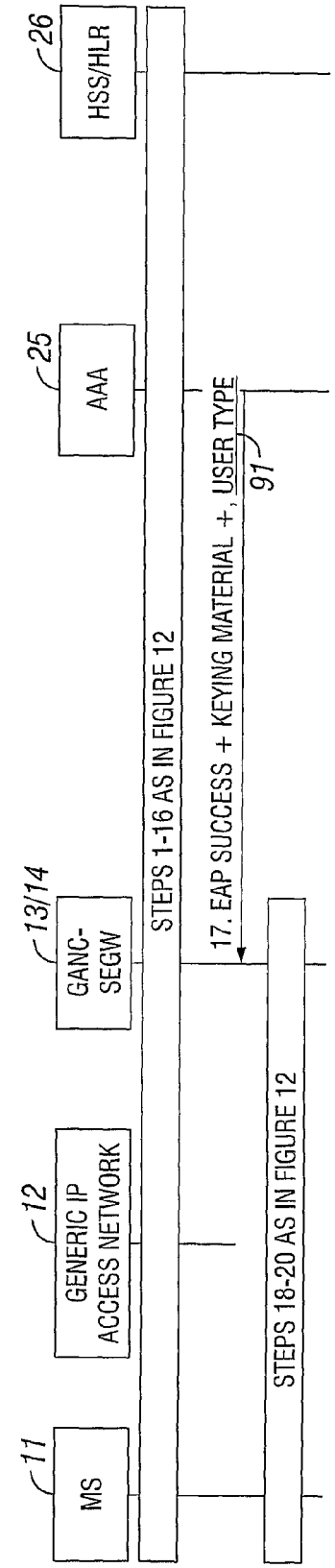
FIG. 14 is a signaling diagram illustrating an extension of FIG. 12 to implement an AAA-based configuration for informing the SEGW of different User types.

FIG. 14 is a signaling diagram illustrating an extension of FIG. 12 to implement the AAA-based configuration for informing the SEGW 14 of different User types. In this embodiment, the new "User type" indication 91 is created in the AAA server 25 rather than the HLR/HSS 26. Again, the User type indication may be based on an individual IMSI or an associated IMSI number series, although other methods of creating the User-type indication are also possible. The AAA server then returns the "User type" information to the SEGW in step 17 and the SEGW utilizes this information to differentiate between different user types.

In the embodiment utilizing an SEGW-based configuration, the new "User type" indication 91 is created in the SEGW 14 and, again, may be based on an individual IMSI or an IMSI number series. The SEGW utilizes this information to differentiate between different user types. One drawback with this approach would be the required O&M. Typically a number of (distributed) SEGWs would exist, and all of them would need to be configured with user-type information associated with different IMSIs or IMSI number series and kept updated.

Figure 1:
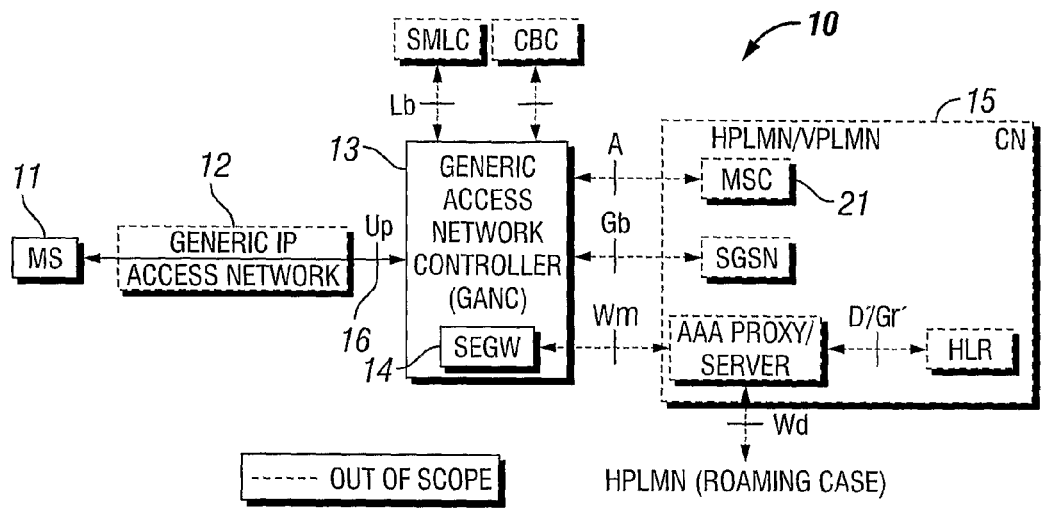
FIG. 1 is a functional block diagram from 3GPP TS 43.318 illustrating an architecture of the Generic Access Network (GAN)
Figure 2:
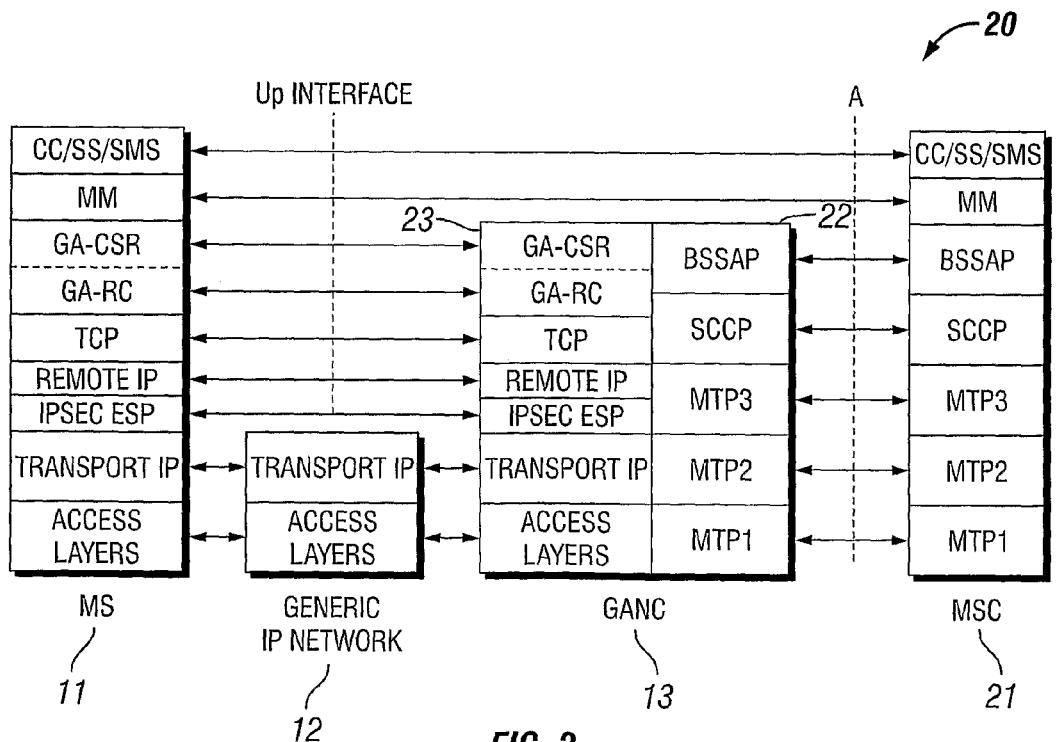
FIG. 2 is a protocol diagram illustrating a circuit-switched (CS) Domain Control Plane Architecture related to the GAN solution of FIG. 1.
Figure 3:
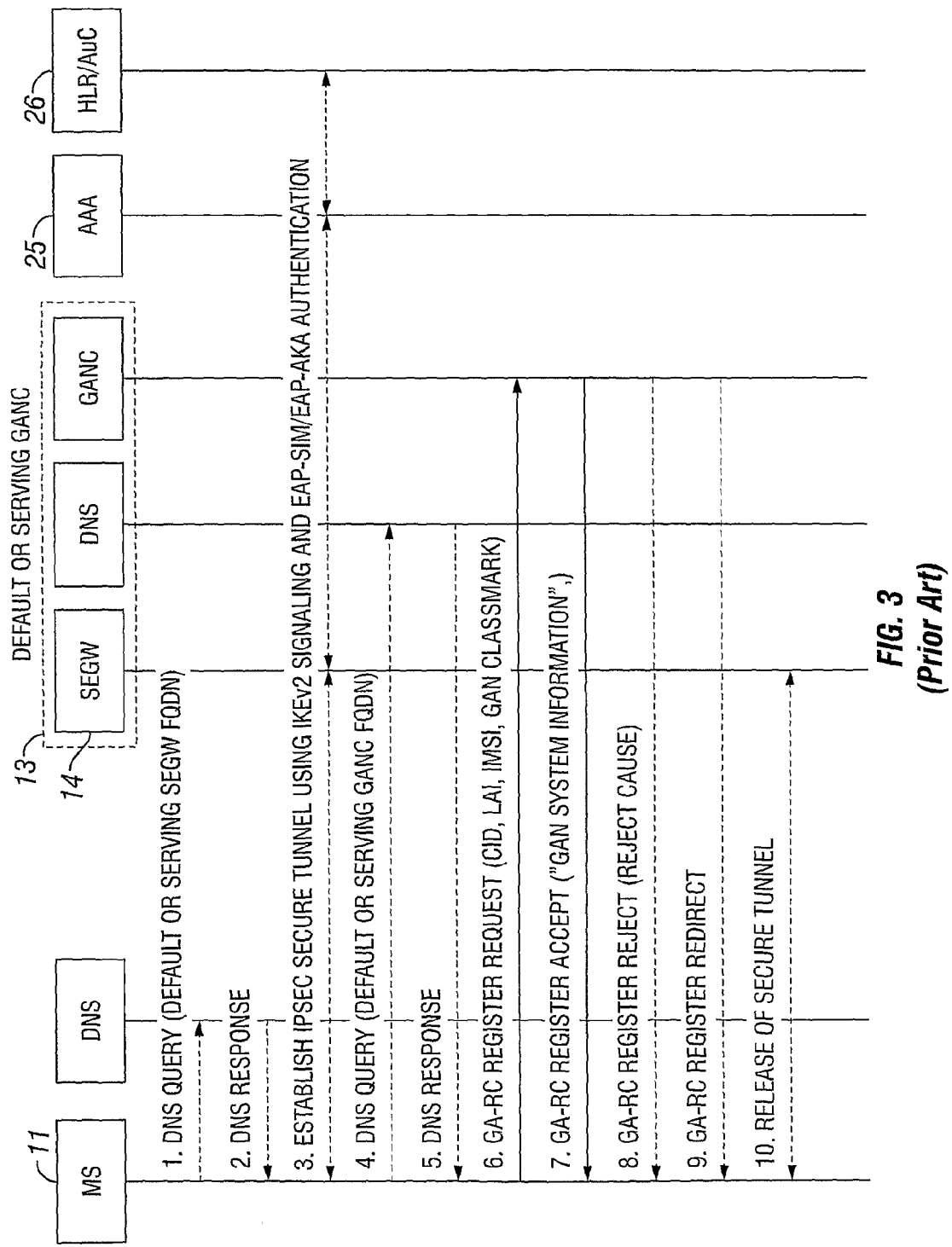
FIG. 3 is a signaling diagram illustrating the existing GAN registration procedure between an MS and a GANC.
Figure 4:
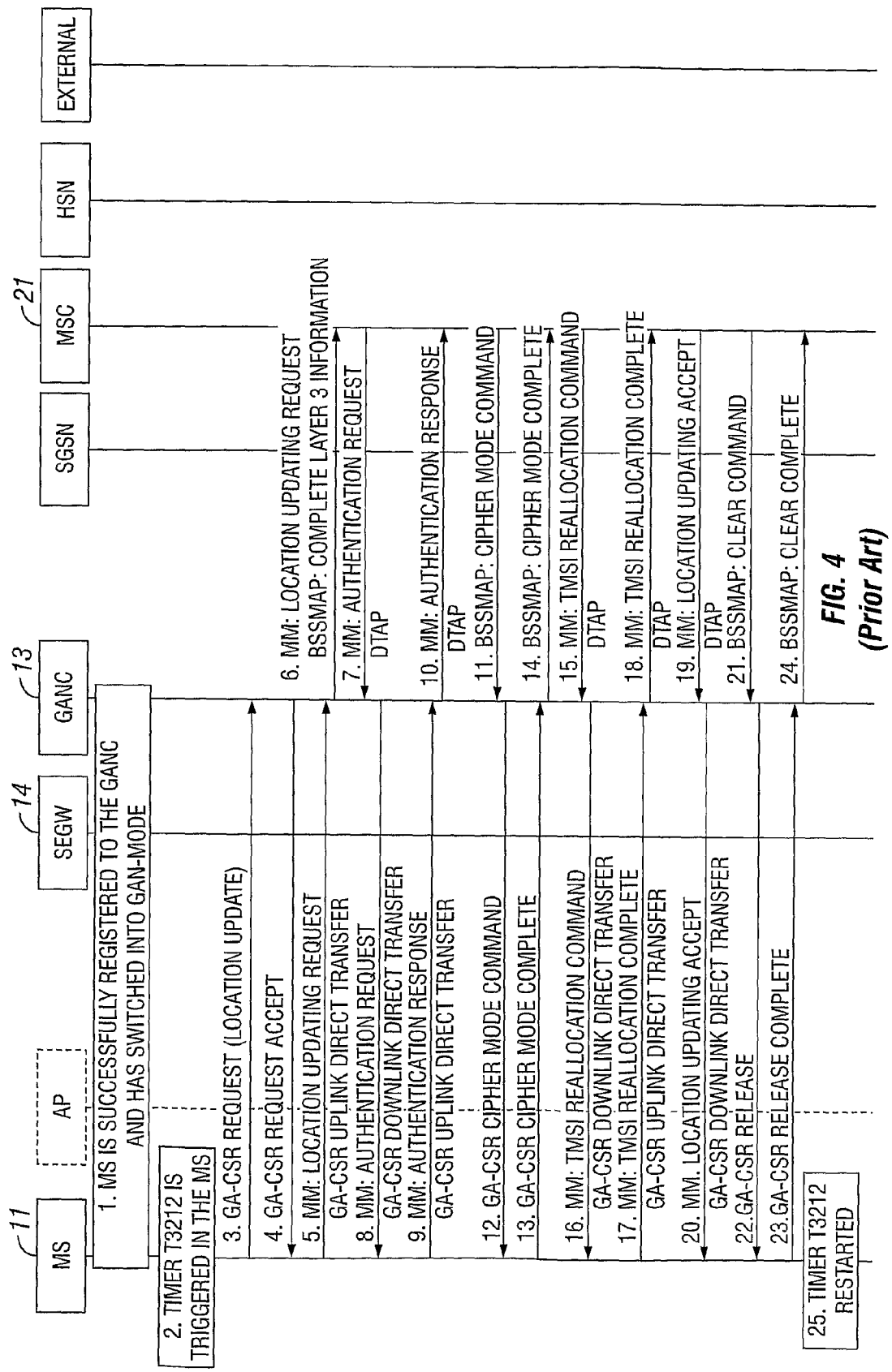
FIG. 4 is a signaling diagram illustrating the existing GAN signaling sequence when a periodic Location Update is performed in GAN-mode.
Figure 5:
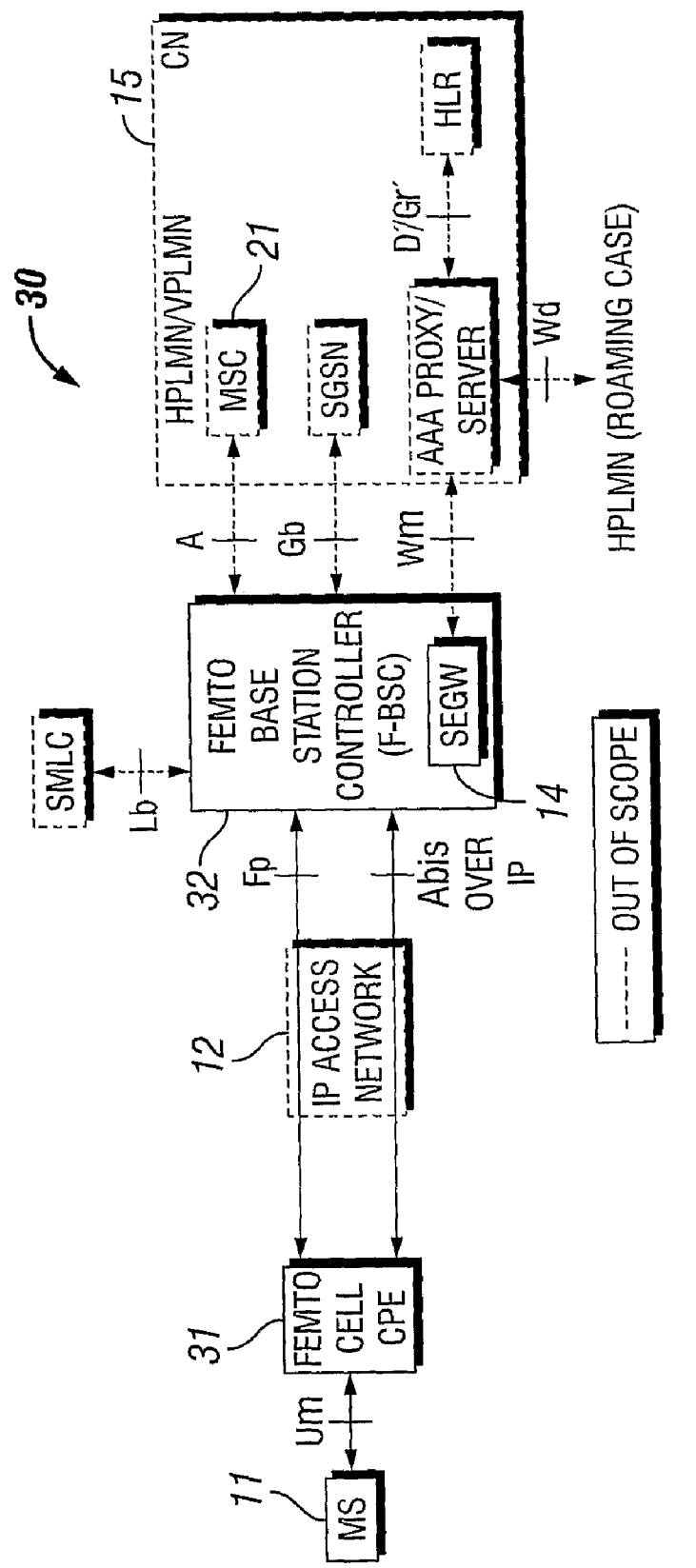
FIG. 5 is a functional block diagram of an architecture of a GSM-Femto access network.
Figure 6:
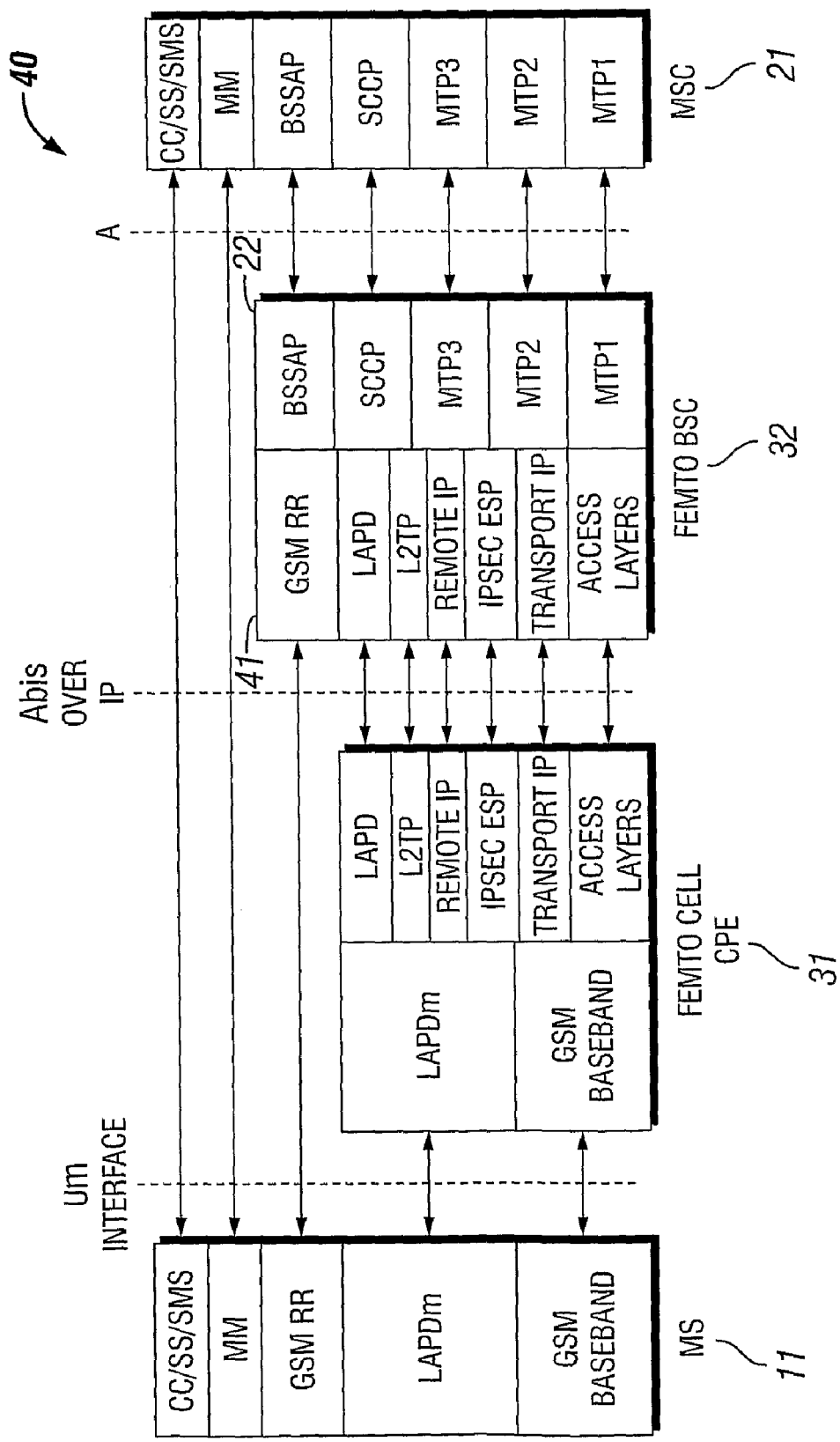
FIG. 6 is a protocol diagram illustrating a CS Domain Control Plane Architecture related to the GSM-Femto solution of FIG. 5.
Figure 15:
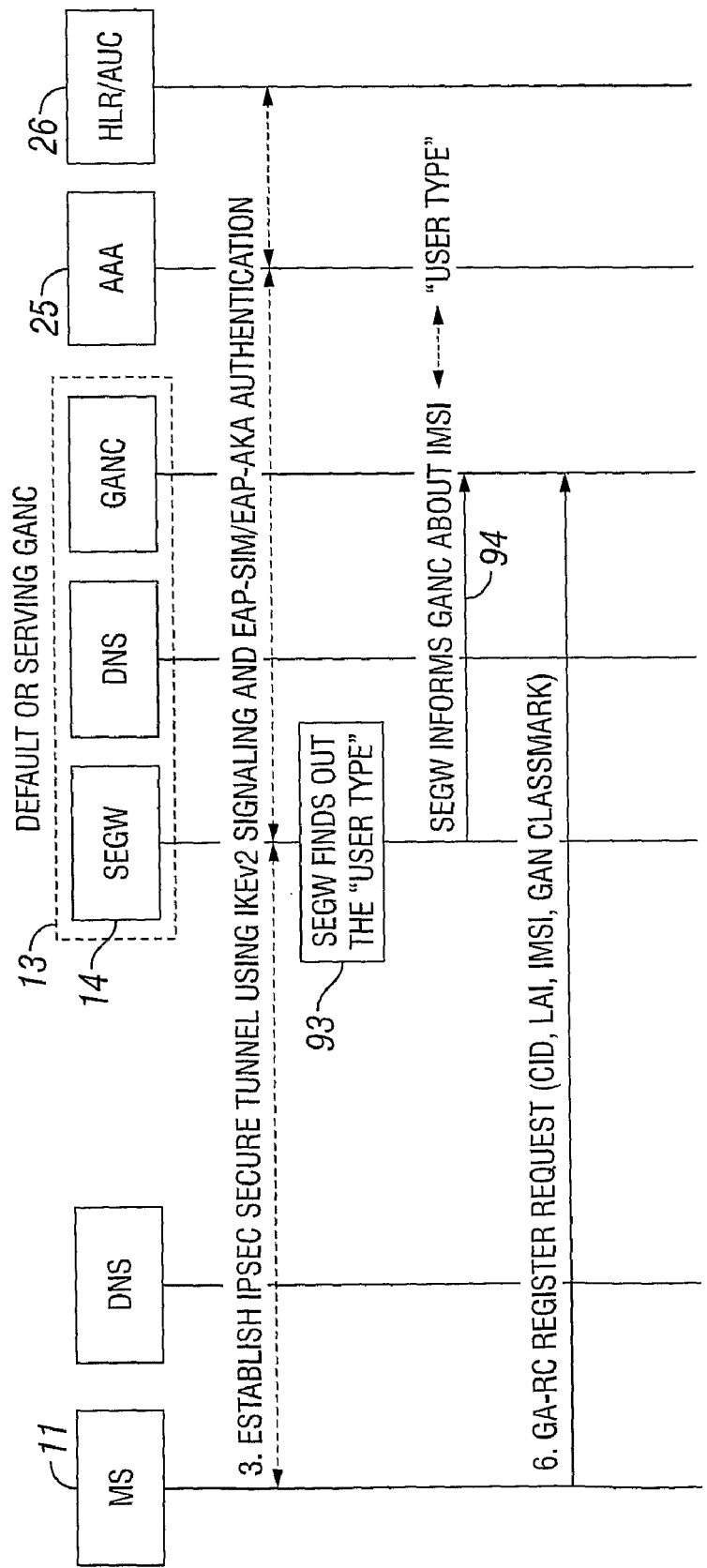
FIG. 15 is a signaling diagram illustrating an embodiment of the present invention for providing User-type information to the GANC.

FIG. 15 is a signaling diagram illustrating an embodiment of the present invention for providing User-type information to the GANC 13. FIG. 15 is a signaling diagram illustrating an extension of the GAN Registration procedure of FIG. 3 to implement the embodiment in which the SEGW 14 provides the User-type information to the GANC. At step 93, the SEGW obtains the User-type indication 91 through one of the embodiments above. At step 94, the SEGW provides the User-type information to the GANC. The GANC then utilizes this information to differentiate between different user types.

In another embodiment of the present invention, the new "User type" indication 91 is created in the GANC 13 and, again, may be based on an individual IMSI or an IMSI number series. The GANC utilizes this information to differentiate between different user types. One drawback with this approach would be the required O&M. Typically a number of GANCs would exist, and all of them would need to be configured with user-type information associated with different IMSIs or IMSI number series and kept updated.

In another embodiment of the present invention, the new "User type" indication is created in a GAN database that is accessible from the GANC 13. The GANC queries the GAN database during the GAN registration procedure of FIG. 3. Again, the User-type information may be based on an individual IMSI or an associated IMSI number series. The GANC then utilizes this information to differentiate between different user types.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. For example, although the exemplary embodiments described herein utilized the GAN-GSM-Femto access network of FIGS. 7 and 8, the invention may also be implemented utilizing the GAN-WCDMA-Femto access network of FIGS. 9 and 10. The specification contemplates any and all modifications that fall within the scope of the invention defined by the following claims.

The invention claimed is:
1. A method in a wireless access network for providing a user-type indication to a Security Gateway, SEGW, during a registration procedure for a user, said method comprising the steps of:
    receiving in an Authentication, Authorization and Accounting, AAA, server, a request to authenticate the user:
    sending a user-type indication for the user from the AAA server to the SEGW with an authentication success message, wherein the user-type indication indicates a specific type of IPsec tunnel based on the user-type, wherein different types of IPsec tunnels are associated with different user-types, and wherein each user's user-type is determined based on the user's International Mobile Station Identity, IMSI or an associated IMSI number series; and
    the SEGW using the received user-type indication for selecting and applying policies associated with the user's user-type to the user-type specific IPsec tunnel indicated through the user-type indication.

2. The method as recited in claim 1, wherein the step of sending the user-type indication to the SEGW includes creating the user-type indication in the AAA server.

3. The method as recited in claim 1, further comprising sending the user-type indication from the SEGW to a Generic Access Network Controller, GANC.

4. The method as recited in claim 1, wherein the step of sending the user-type indication to the SEGW includes the steps of:
    sending a request from the AAA server to a Home Location Register, HLR, requesting authentication information for the user;
    creating the user-type indication in the HLR;
    sending a response from the HLR to the AAA server containing the requested authentication information and the user-type indication for the user; and
    forwarding the user-type indication from the AAA server to the SEGW.

5. The method as recited in claim 4, further comprising sending the user-type indication from the SEGW to a Generic Access Network Controller, GANC.

6. The method as recited in claim 1, wherein the step of the SEGW using the received user-type indication includes the SEGW placing allowed limitations on the IPsec tunnel, said limitations being selected from a group consisting of allowed bandwidth, allowed number of TCP connections, allowed number of UDP flows, allowed destination IP addresses, allowed protocol, allowed destination protocol ports, allowed number of IPsec security associations, and allowed packets per second.

7. A method for determining user-type information in a Security Gateway, SEGW, in a wireless access network during a registration procedure for a user, said method comprising the steps of:
    storing in the SEGW, a database associating different International Mobile Station Identities, IMSIs, or IMSI number series with user-type information indicating a specific type of IPsec tunnel based on the user type, wherein different types of IPsec tunnels are associated with different user-types;
    the SEGW receiving the user's IMSI during the registration procedure;
    the SEGW determining user-type information for the user based on the user's IMSI or an associated IMSI number series; and
    the SEGW using the determined user-type information for selecting and applying policies associated with the user's user-type to the user-type specific IPsec tunnel.

8. The method as recited in claim 7, further comprising sending the user-type information from the SEGW to a Generic Access Network Controller, GANC.

9. The method as recited in claim 7, wherein the step of he SEGW using the determined user-type information includes the SEGW placing allowed limitations on the IPsec tunnel, said limitations being selected from a group consisting of allowed bandwidth, allowed number of TCP connections, allowed number of UDP flows, allowed destination IP addresses, allowed protocol, allowed destination protocol ports, allowed number of IPsec security associations, and allowed packets per second.

10. An Authentication, Authorization and Accounting, AAA, server, for providing a user-type indication to a Security Gateway, SEGW, during a registration procedure for a user, said AAA server configured to perform the following:
   receive a request to authenticate the user; and
   send a user-type indication for the user to the SEGW with an authentication success message, wherein the user-type indication indicates a specific type of IPsec tunnel based on the user-type, wherein different types of IPsec tunnels are associated with different user-types, and wherein each user's user-type is determined based on the user's International Mobile Station Identity, IMSI or an associated IMSI number series:
   wherein the SEGW utilizes the received user-type indication for selecting and applying policies associated with the user's user-type to the user-type specific IPsec tunnel indicated through the user-type indication.

11. The AAA server as recited in 10, further configured to create the user-type indication in the AAA server.

12. The AAA server as recited in claim 10, wherein the AAA server is configured to send the user-type indication to the SEGW by:
   sending a request from the AAA server to a Home Location Register, HLR, requesting authentication information for the user;
   receiving a response from the HLR containing the requested authentication information and the user-type indication for the user; and
   forwarding the user-type indication from the AAA server to the SEGW.

13. A Security Gateway, SEGW, in an access network, said SEGVV is configured to perform the following:
   associate user-type information with different International Mobile Station Identities, IMSIs, or IMSI number series, wherein the user-type information indicates a specific type of IPsec tunnel based on the user type, wherein different types of IPsec tunnels are associated with different user-type;
   receive a user's IMSI during a registration procedure;
   determine user-type information for the user based on the user's IMSI or an associated IMSI number series; and
   use the determined user-type information in the SEGW for selecting and applying policies associated with the user's user-type to the user-type specific IPsec tunnel.

14. The SEGW as recited in claim 13, wherein the registration procedure is performed in a Generic Access Network, GAN, and the SEGW is further configured to send the user-type information from the SEGW to a Generic Access Network Controller, GANC.

15. The SEGW as recited in claim 13, wherein the SEGW is configured to use the determined user-type information by placing allowed limitations on the IPsec tunnel, said limitations being selected from a group consisting of allowed bandwidth, allowed number of TCP connections, allowed number of UDP flows, allowed destination IP addresses, allowed protocol, allowed destination protocol ports, allowed number of IPsec security associations, and allowed packets per second.

16. A method in a Security Gateway, SEGW, in a wireless access network for selecting and applying policies to an IPsec tunnel during a registration procedure for a user in which an Authentication, Authorization and Accounting, AAA, server receives a request to authenticate the user, said method comprising the steps of
   the SEGW receiving from the AAA server, an authentication success message including a user-type indication for the user, wherein the user-type indication indicates a specific type of IPsec tunnel based on the user-type, wherein different types of IPsec tunnels are associated with different user-types, and wherein each user's user-type is determined based on the user's International Mobile Station Identity, IMSI, or an associated IMSI number series; and
   the SEGW utilizing the received user-type indication for selecting and applying policies associated with the user's user-type to the user-type specific IPsec tunnel indicated through the user-type indication.

* * * * *

UNITED STATES PATENT AND TRADEMARK OFFICE
CERTIFICATE OF CORRECTION

PATENT NO. : 8,413,226 B2
APPLICATION NO. : 12/992227
DATED : April 2, 2013
INVENTOR(S) : Vikberg et al.

It is certified that error appears in the above-identified patent and that said Letters Patent is hereby corrected as shown below:

In the Claims

In Column 10, Line 3, in Claim 1, delete "user:" and insert -- user; --, therefor.

In Column 10, Line 11, in Claim 1, delete "IMSI" and insert -- IMSI, --, therefor.

In Column 11, Line 1, in Claim 9, delete "he" and insert -- the --, therefor.

In Column 11, Line 21, in Claim 10, delete "IMSI" and insert -- IMSI, --, therefor.

In Column 11, Line 22, in Claim 10, delete "series:" and insert -- series; --, therefor.

In Column 11, Line 27, in Claim 11, delete "in 10," and insert -- in claim 10, --, therefor.

In Column 11, Line 41, in Claim 13, delete "SEGVV" and insert -- SEGW --, therefor.

In Column 12, Line 3, in Claim 13, delete "user-type;" and insert -- user-types; --, therefor.

In Column 12, Line 7, in Claim 13, after "information", delete "in the SEGW".

In Column 12, Line 29, in Claim 16, delete "of" and insert -- of: --, therefor.

Signed and Sealed this
Ninth Day of July, 2013

Teresa Stanek Rea
*Acting Director of the United States Patent and Trademark Office*